G. E. FARISS.
SAMPLE DISPLAYING APPARATUS.
APPLICATION FILED JUNE 8, 1908.
906,210.
Patented Dec. 8, 1908.
2 SHEETS—SHEET 1.
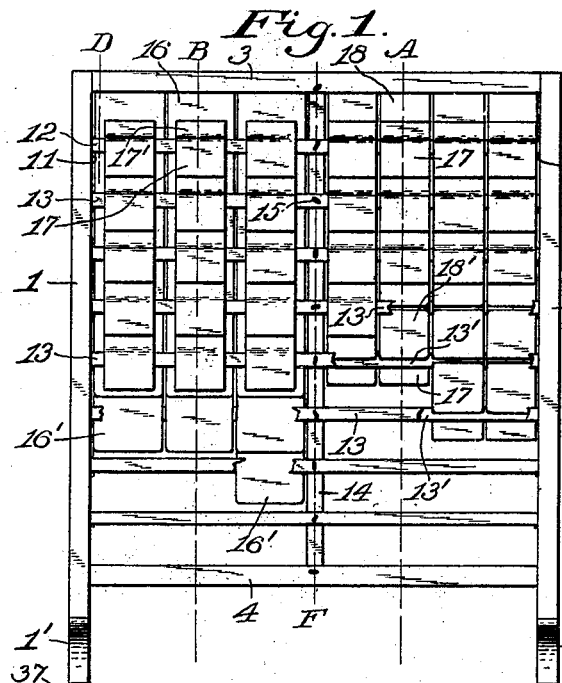
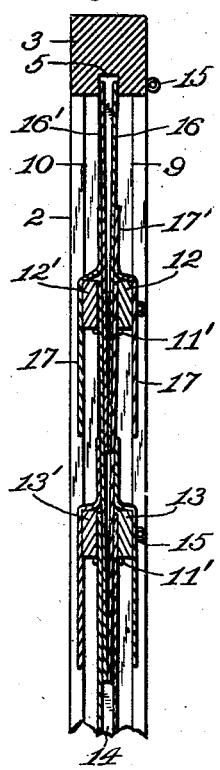
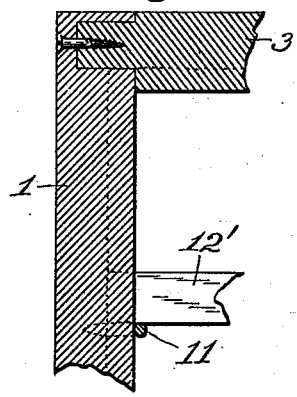
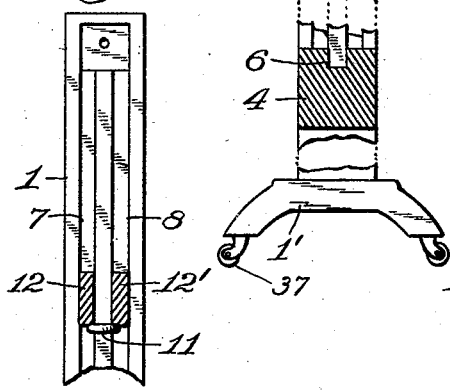
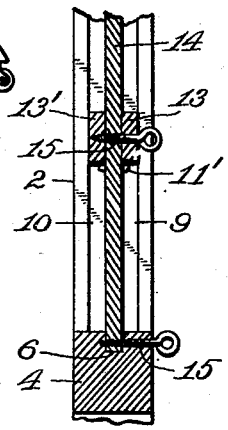
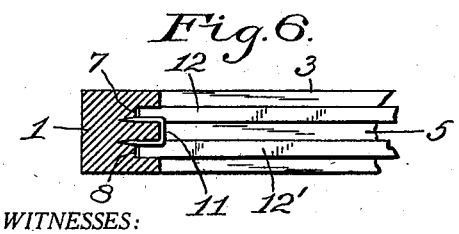
WITNESSES:
J. H. Gardner.
K. R. Woddell.
INVENTOR:
George E. Fariss,
BY
E. T. Silvius,
ATTORNEY.

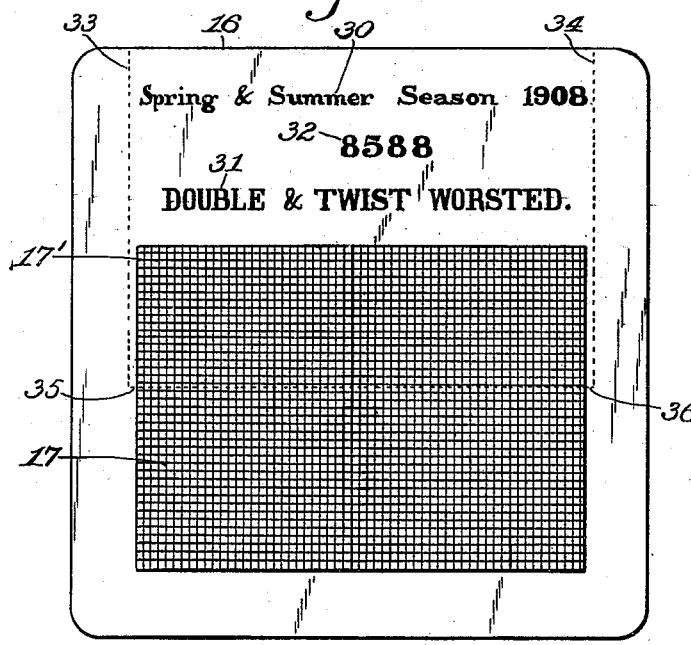

UNITED STATES PATENT OFFICE.

GEORGE E. FARISS, OF NOBLESVILLE, INDIANA.

SAMPLE-DISPLAYING APPARATUS.

No. 906,210.  Specification of Letters Patent.  Patented Dec. 8, 1908.

Application filed June 8, 1908. Serial No. 437,313.

*To all whom it may concern:*

Be it known that I, GEORGE E. FARISS, a citizen of the United States, residing at Noblesville, in the county of Hamilton and State of Indiana, have invented certain new and useful Improvements in Sample-Displaying Apparatus; and I do declare the following to be a full, clear, and exact description of the invention, reference being had to the accompanying drawings, and to the letters and figures of reference marked thereon, which form a part of this specification.

This invention relates to the display or exhibition of samples of goods of various kinds, such as cloth for making clothing, the invention having reference more particularly to racks on which the samples may be conveniently arranged, so they may be readily compared one with another and the character or quality of the goods readily ascertained.

The objects of the invention are to provide means whereby samples of various articles may be most conveniently arranged for displaying, and to provide a display rack that will be adjustable, so as to accommodate various sizes of samples, or sample cards, especially to enable tailors or merchants to show samples to their customers to the best advantage and expeditiously, a further object being to provide a display stand for displaying samples of goods on cards that may be constructed cheaply, and be durable and economical in use.

With the above mentioned and other objects in view, the invention consists in improved sample displaying apparatus comprising a rack having horizontal rails supported adjustably and adapted to support cards having samples thereon so that there may be samples on two sides of the rack, the rack being provided with casters, so as to be conveniently moved into the best light available, or to be moved out of the way when not in use, and the invention consists further in the novel parts, and in the combinations and arrangements of parts, as hereinafter particularly described and defined in the appended claims.

Referring to the drawings Figure 1 is an elevation of the rack partially filled with samples; Fig. 2, a fragmentary transverse sectional view on the line A in Fig. 1; Fig. 3, a fragmentary transverse sectional view on the line B in Fig. 1; Fig. 4, a fragmentary sectional view on the line C in Fig. 2, omitting the samples; Fig. 5, a fragmentary sectional view at the line D in Fig. 1; Fig. 6, a fragmentary horizontal sectional view on the line E in Fig. 2 looking upward, and omitting the samples; Fig. 7, a fragmentary vertical sectional view on the line F in Fig. 1; Fig. 8, a fragmentary elevation showing modifications of construction; Fig. 9, a vertical sectional view on the line G in Fig. 8; Fig. 10, a fragmentary horizontal sectional view on the line H in Fig. 9; Fig. 11, a fragmentary vertical sectional view on the line I in Fig. 9; Fig. 12, a fragmentary horizontal sectional view looking upward on the line J in Fig. 11; Fig. 13, a fragmentary horizontal sectional view showing modifications of parts of the rack; Fig. 14, a fragmentary top plan of a modified form of sample supporting rail; Fig. 15, a fragmentary vertical sectional view of the modified form of rail; and Fig. 16, a front elevation of a sample card, and sample of cloth thereon, such as are furnished to merchant tailors, or others, to aid them and their customers in the selection of goods.

Similar reference characters in the different figures of the drawings indicate corresponding elements or features herein referred to.

In practically embodying the invention the display-rack may be variously constructed in detail, the preferred construction comprising a vertical wooden standard 1, provided with a foot piece 1', and a similar standard 2, provided with a foot piece 2', a top rail 3 suitably attached to the tops of the standards, and a bottom rail 4 suitably attached to the lower portions of the standards, all forming a stiff frame adapted to be moved about on the floor of an establishment; the under side of the top rail 3 has a longitudinal groove 5 therein, and the upper side of the bottom rail 4 has a longitudinal groove 6 formed therein, the grooves being adapted to have edges of display cards inserted therein. The inner side of the standard 1 has two vertical guide grooves or channels 7 and 8 therein, there being a tongue-like portion between them, and the inner side of the standard 2 has similar channels 9 and 10 formed therein, the channels extending from the bottom rail to the top rail of the frame. In order to support the sample supporting rails adjustably so that various sizes of sample cards may be accommodated, and thus enable the rack to accommodate the greatest number of samples, a plurality of staples 11 are secured removably to the standards with the legs of the staples embracing the tongue-like portions between the grooves, the legs being in the grooves and the points of the staples entering the wood at the bottoms of the grooves. These staples are relatively small and may usually be pushed into the wood by hand a sufficient distance to sustain the slight weights placed upon them, and consequently may be readily withdrawn by hand and again inserted in different positions. A suitable number of relatively thin rails are arranged in pairs, as rails 12 and 12′, and other rails 13 and 13′, the rails all being alike and having their ends extending into the grooves of the standards and resting on the staples 11 and 11′. Midway between the standards is a vertical wooden support 14 that extends from the bottom rail 4 between the two rails of each pair of sample supporting rails up to the top rail 3, and each pair of rails, as 12 and 12′, are connected to the support by a suitable pin 15 that may be withdrawn at pleasure and reinserted in case the positions of the rails are shifted, the pins preferably having screws thereon, and if desired the well known form of screw-eye may be employed for the purpose of holding the rails stiffly at their middle portions. In small sizes of racks, however, the support 14 may be omitted.

The samples that are to be displayed are suitably mounted on somewhat stiff cardboard plates, as 16 or 16′, and the samples 17 may be fabric of various kinds, or wall paper, or various articles of commerce, and when of flexible sheet material are attached at their upper portions 17′ to the cards or plates, as 16, preferably somewhat below the tops thereof, so that space is left on the upper portions of the cards on which to indicate the nature or character of the samples. The cards, as 16 and 16′, are somewhat longer and wider than the sample 17, and the upper edges of the cards are inserted in the groove 5 of the upper rail, or between rails 12 and 12′, or the rails 13 and 13′, and the lower edges of the cards extend into the spaces between the rails of each pair, the samples that are on the cards 16 extending down at the fronts of the rails 12 and 13 and the samples that are on the cards 16′ extending down over the fronts of the rails 12′ and 13′, so that samples are displayed on two sides of the rack.

It will be observed by referring to Figs. 1 and 3 that the cards extend considerably below the rails that support the samples which are attached to the cards, and that the samples cover the upper portions of all the cards except those in the uppermost row adjacent to the top rail, but it should be understood, of course, that if desired, the rows may be spaced farther apart, so that the upper portions of all the cards may be seen. In some cases the cards and the samples may be of approximately the same size and the samples connected to the lower portions of the cards, as shown in Fig. 2, and on the right-hand side in Fig. 1, and in such cases the lower portions of the cards extend but slightly below the tops of the rails, as 12 and 12′, and between them, the samples extending over the rails serving to hold up the cards in the groove 5 of the upper rail or between the other rails when arranged in the lower rows. It should be understood, also, that when the smaller cards are used the separate rails, as 12 and 12′, are not necessarily constructed as described hereinbefore, but may be a single rail as will be hereinafter described, inasmuch as the cards are not sufficiently long to extend vertically through the space between the two rails, as it will be seen that the cards 18 and 18′ extend into the groove 5 of the upper rail, and but a short distance down between the two rails 12 and 12′.

In Figs. 8 to 12 slightly modified forms of construction are illustrated in which the standard 19 is substantially the same as the standards 1 and 2 except that the inner side thereof has one vertical groove 20 instead of two grooves, and single rails 21 are supported by the staples 11, the staples being inserted in the grooves 20 and engaging the opposite sides of the grooves with the points of the staples extending slightly into the wood at the bottoms of the grooves, each rail 21 having a shallow groove 22 in the top thereof to receive the lower edges of two cards 18 and 18′ and the under sides of the rails having each a relatively deep groove 23 therein to receive the upper edges of the cards and afford clearance space so that the cards may be raised somewhat while inserting the lower edges into or removing them from the grooves 22. A middle portion of each rail 21 has an aperture 24 therein through which the support 14 extends, the support and the rail being connected by a pin 15.

In some cases, as illustrated in Fig. 13, the standards as 25 may have two grooves 26 and 27 in the inner sides thereof so that they are like the standards 1 and 2, and the single rails 21 may each have two projections 28 and 29 on each end thereof adapted to fit into the two grooves and rest on the staples.

Referring to Fig. 16, it will be seen that the card 16 has a line of words 30 indicating seasonable goods, and a line of words 31 indicating quality of the goods per samples, and numerals 32 indicating the catalogue number of the sample of goods; the card 16 extends beyond the sample 17 in every direction and when it is an object to utilize all the space in the rack the cards may be reduced in size so that they would be of the dimensions indicated as between the lines 33 and 34 and from the upper edge of the card to the lines 35 and 36. In order to be able to conveniently move the display-rack on the floor the foot pieces 1′ and 2′ are provided with casters 37, so that in a dark room the rack may be moved to a window or near an artificial light, or turned about in different directions to obtain the best light on the samples.

It will be clear from the foregoing that the two rails, as 12 and 12', serve the purpose of one rail composed of two parts fastened together at their ends and their middle portions, the standards serving to connect the ends of the rails together and the support 14 connecting the middle portions of the rails together, and that the two rails as described are employed only in the interest of simplicity of construction.

In practical use the rack may be supplied with a suitable number of cards, and samples may be suitably attached to the cards, and when new samples are received they may be substituted for the old samples, or samples may be received by the merchant attached to cards, and such cards may be of various sizes so that the merchant may find it necessary to readjust the sample supporting rails so as to have the desired distances apart to accommodate the cards, and as will readily be seen the rack may contain some of the double rails as 12 and 12' and also some of the single rails.

Having thus described the invention, what is claimed as new, is—

1. Sample-displaying apparatus including a rack comprising two upright standards having each a vertical guide at the inner side thereof, supporting devices attached to the standards in contact with the vertical guides, and horizontal rails having their ends loosely engaging the vertical guides and resting on the supporting devices.

2. Sample-displaying apparatus including a rack comprising two upright standards having each a vertical groove in the inner side thereof, each groove having a plurality of supporting devices therein that enter the standard at the bottom of the groove, and horizontal rails having their ends in the grooves and resting on the supporting devices.

3. Sample displaying apparatus including a rack comprising two upright standards having each a vertical guide at the inner side thereof, a top rail and a bottom rail attached to the standards, a plurality of guide-rails between the top rail and the bottom rail and joined to the standards in engagement with the guides, and devices connected to the standards in engagement with the guides thereof and supporting the plurality of guide-rails.

4. Sample-displaying apparatus including a rack comprising two upright standards having guides at the inner sides thereof, a horizontal top rail attached to the standards and having a guide at the under side thereof to guide sample-cards, a bottom rail attached to the standards and having a guide at the top thereof to guide sample-cards, a plurality of guide rails between the top rail and the bottom rail and joined to the standards for guiding sample-cards, devices connected to the standards and supporting the plurality of rails, a support extending from the bottom rail to the top rail between the standards, devices connecting the support to the plurality of rails, and display-cards guided and retained by the rails.

5. A sample-displaying rack comprising two upright standards having each a vertical groove in the inner side thereof, a top rail and a bottom rail attached to the standards, foot-pieces attached to the standards for their support, casters connected to the foot-pieces, a support connected to the top rail and the bottom rail between the standards, a plurality of staples mounted removably on the standards, a plurality of rails extending into the grooves of the standards and resting on the staples, and a plurality of pins connecting the plurality of rails removably to the support.

6. The combination of a pair of upright standards, a pair of rails attached to the standards, foot-pieces attached to the standards, casters connected to the foot-pieces, a supplemental support connected to the pair of rails, a plurality of rails supported adjustably by the standards and also by the supplemental support, a plurality of sample-cards guided and retained by the plurality of rails, and flexible sheets attached to the sample-cards and resting on the plurality of rails and thereby supporting the sample-cards.

In testimony whereof, I affix my signature in presence of two witnesses.

GEORGE E. FARISS.

Witnesses:
WM. E. DUNN,
EARL S. BAKER.